3,041,207
Patented June 26, 1962

3,041,207
FIRE RETARDANT COATING AND PRODUCT RESULTING THEREFROM
John R. Caldwell, Kingsport, Tenn., assignor to Eastman Kodak Company, Rochester, N.Y., a corporation of New Jersey
No Drawing. Filed Jan. 19, 1959, Ser. No. 787,392
5 Claims. (Cl. 117—136)

This invention concerns the preparation and use of fire resistant coatings, in particular coatings which are prepared from a polyisocyanate reacted with a phosphorous derivative.

The prior art recognizes many materials such as phosphorous and phosphoric acid esters and amides which have been found useful as fire retardants on textiles, paper, and the like. However, many of these materials are unsuitable since they are not retained by the fabric during normal washing or dry cleaning processes. For instance, ammonium phosphate is not readily fixed in the material in such a way as to resist water and, therefore, most of it is removed by washing.

When certain organic phosphates have been employed as fire retardants they ordinarily must be used in amounts at least as large as 30% by weight of the material and sometimes as much as 50%. In using such a large amount, there has been a problem in retaining this amount of material on the textile, paper, or the like material.

I have found a way of combining phosphorous into an organic molecule which not only is effective as a fire retardant when coated on cellulosic materials, but also adheres tenaciously to the treated material and is not normally removed by contact with water, soap solutions or organic solvents.

One object of this invention is to provide fire resistant coatings for textiles, paper, wood, films and the like. Another object of this invention is to provide fire resistant coatings that are not easily removed by contact with water, soap solutions, or organic solvents. A further object of the invention is to provide fire resistant coatings comprising a trivalent or pentavalent phosphorous derivative and a polyisocyanate.

These objects are obtained by treating combustible, nonvolatile organic materials with a mixture of a trivalent or pentavalent phosphorous derivative and a polyisocyanate. The phosphorous derivative is cemented to the surface by the polyisocyanate and the coating has substantial resistance to removal by water, organic solvents, and abrasion.

Suitable classes of compounds are as follows:

$$R'-O-P(=O)(NHR)(NHR) \quad \text{(Ann. 407, 290 (1915))}$$

$$(RNH)_3PO \quad \text{(Ann. 326, 129 (1903))}$$

R is hydrogen, alkyl containing 1–4 carbon atoms, or aryl containing 6 to 8 carbon atoms.

R' is alkyl containing 1–4 carbon atoms, or aryl which may be substituted with halogen, amide, or sulfonamide.

Certain isocyanate compounds such as those which contain two or more isocyanate groups or latent isocyanate groups can be used. In general, any diisocyanate or triisocyanate may be used. Suitable examples include hexamethylenediisocyanate, 2,4-tolylenediisocyanate, p,p'-diisocyanatodiphenylmethane, 1-chlorophenylene-2,4-diisocyanate, and naphthalene triisocyanate.

Additional isocyanate compounds which may be used include polymethylene diisocyanates and diisothiocyanates such as ethylene diisocyanate, trimethylene diisocyanate, dodecamethylene diisocyanate, hexamethylene diisocyanate, tetramethylene diisocyanate, pentamethylene diisocyanate, and the corresponding diisothiocyanates; alkylene diisocyanates and diisothiocyanate such as propylene-1,2-diisocyanate, 2,3-dimethyltetramethylene diisocyanate and diisothiocyanate, butylene-1,2-diisocyanate, butylene-1,3-diisothiocyanate, and butylene-1,3-diisocyanate; alkylidene diisocyanates and diisothiocyanates such as ethylidene diisocyanate $(CH_3CH(NCO)_2)$ and heptylidene diisothiocyanate $(CH_3(CH_2)_5CH(CNS)_2)$; cycloalkylene diisocyanates and diisothiocyanates such as 1,4-diisocyanatocyclohexane, cyclopentylene-1,3-diisocyanate, and cyclohexylene-1,2-diisothiocyanate; aromatic polyisocyanates and polyisothiocyanates such as m-phenylene diisothiocyanate, p-phenylene diisocyanate, p-phenylene diisothiocyanate, 1-methyl-phenylene-2,4-diisocyanate, naphthylene-1,4-diisocyanate, o,o'-toluene diisocyanate, diphenyl-4,4'-diisothiocyanate and diisocyanate, benzene-1,2,4-triisothiocyanate, 5-nitro-1,3-phenylene diisocyanate, xylylene-1,4-diisocyanate, xylylene-1,3-diisocyanate, 4,4'-diphenylenemethane diisocyanate, 4,4'-diphenylenepropane diisocyanate and xylylene-1,4 diisothiocyanate; aliphatic-aromatic diisocyanates and diisothiocyanates such as phenylethylene diisocyanate $$(C_5H_6CH(NCO)CH_2NCO)$$

diisocyanates and diisothiocyanates containing heteroatoms such as $SCNCH_2OCH_2NSC$, $$SCNCH_2CH_2OCH_2CH_2NSC$$

and $SCN(CH_2)_3-S-(CH_2)_3NSC$; 1,2,3,4-tetraisocyanatobutane, butane-1,2,2-triisocyanate, 1-isocyanato-4-isothiocyanatohexane, and 2-chloro-1,3-diisocyanatopropane. Mixtures of two or more of such compounds can be used.

Typical diisocyanates, diisothiocyanates and mixed isocyanate-isothiocyanates have the general formula, R'CNRNCR' in which R is a divalent hydrocarbon radical and R' may be oxygen or sulphur.

In our preferred embodiment the amount of polyisocyanate required to produce a satisfactory adhesion to the treated material is from 20–100% based on the weight of the phosphorous derivative. In order to obtain adequate retardant action, from 1–20% of the phosphorous derivative is applied based on the weight of the textile, paper, or the like. However, our preferred range is from 5 to 10% of the phosphorous derivative. The phosphorous compounds and polymers may or may not be soluble in the common solvents. If they are soluble, they can be dissolved in a common solvent with the polyisocyanate for application. If they are insoluble, they can be ground or pulverized and mixed as slurries with the polyisocyanate.

The following examples are intended to illustrate our invention but not to limit it in any way:

*Example 1*

One molecular equivalent of triethylene glycol and two molecular equivalents of 2,4-tolylene-diisocyanate were heated in dioxane solution at 80° C. for one hour. This product (A) can be used to anchor or cement a wide variety of phosphorus derivatives to textiles, paper, wood, etc.

One part of product (A) and two parts of $$C_4H_9O-PO(NHC_2H_5)_2$$

were mixed in tertiary butyl alcohol and the mixture was applied to cellulose acetate, cotton, and viscose fabrics. It was also applied to paper. The presence of 6–8% of the mixture, on a dry weight basis, retarded burning substantially.

A linear polyester was made by heating $C_6H_5POCl_2$ with hydroquinone as described in U.S. Patent 2,435,252. One part of product (A) and two parts of the polyester were mixed in dioxane and applied to various textile fabrics, to give gain in weight of 10–12%. The fabrics were then heated at 100° C. for forty minutes to cure the coating. The fabrics showed improved resistance to burning after being laundered or dry-cleaned five or six times.

Example 2

A polyester was prepared by heating four moles of tetramethylene glycol with three moles of azelaic acid and the ester was heated with two moles of 4,4'-diphenylmethanediisocyanate. One part of the product was mixed with one part of the phosphorus-nitrogen compound described in U.S. Patent 2,544,706. The phosphorus-nitrogen compound had been pulverized to a particle size of through 200-mesh. The mixture was coated on a cellulose acetate fabric to give an increase in weight of 10–15%, and the fabric was heated at 90–100° C. for one hour. The fabric showed increased resistance to burning.

I claim:

1. A polymeric material comprising a phosphorus derivative having the following formula

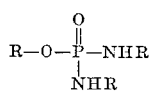

in which R is alkyl containing 1–4 carbon atoms reacted at a temperature of 80–100° C. with an organic polyisocyanate.

2. A fibrous material having a fire retardant coating thereon comprising a mixture of an organic phosphorous compound having the following formula

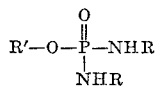

wherein R is alkyl containing 1–4 carbon atoms and wherein R' is alkyl containing 1–4 carbon atoms, reacted at a temperature of 80–100° C. with an organic polyisocyanate.

3. A fibrous material having a fire retardant coating thereon comprising a mixture of 1–20% based on the weight of the fibrous material of a linear polymer in which the repeating unit consists of

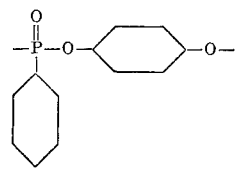

reacted with 20–100% based on the weight of the linear polymer of an organic polyisocyanate.

4. A fibrous material having a fire retardant coating thereon comprising a mixture of 1–20% of an organic phosphorous compound based on the weight of the fibrous material prepared by reacting 2–4 moles of melamine with 1 mole phosphorous pentoxide, and 20–100% based on the weight of the phosphorous compound of an organic polyisocyanate.

5. A fire retardant fabric having a coating thereon comprising 1–20% based on the weight of the fabric of an organic phosphorous compound selected from the class consisting of the following

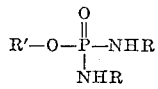

in which R is alkyl containing 1–4 carbon atoms and wherein R' is alkyl containing 1–4 carbon atoms, a linear polymer in which the repeating unit consists of

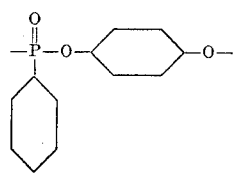

and the reaction product of 2–4 moles of melamine with 1 mole of phosphorous pentoxide, said organic phosphorous compound reacted with 20–100% based on the weight of the phosphorous compound of an organic polyisocyanate.

References Cited in the file of this patent

UNITED STATES PATENTS 2,691,566    Kvalnes et al. ---------- Oct. 12, 1954